(12) United States Patent
Luo et al.

(10) Patent No.: US 10,612,978 B2
(45) Date of Patent: Apr. 7, 2020

(54) LIGHT EMITTING DIODE COLOR RESOLUTION TESTING

(71) Applicant: INTERNATIONAL BUSINESS MACHINES CORPORATION, Armonk, NY (US)

(72) Inventors: Yuhua Luo, Shenzhen (CN); Zexin Luo, Shenzhen (CN); Michael B. Monjardin, Shenzhen (CN); LiCen Mu, Shenzhen (CN); Zhipeng Wang, Zhongshan (CN); XiYuan Yin, Guangzhou (CN); WeiFeng Zhang, Shenzhen (CN); Jia Yu Zheng, Shenzhen (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 15/908,982

(22) Filed: Mar. 1, 2018

(65) Prior Publication Data

US 2019/0271587 A1 Sep. 5, 2019

(51) Int. Cl.
*G01J 3/50* (2006.01)
*G01J 1/42* (2006.01)
(Continued)

(52) U.S. Cl.
CPC .............. *G01J 3/505* (2013.01); *G01J 1/0492* (2013.01); *G01J 1/42* (2013.01); *G01J 1/4228* (2013.01);
(Continued)

(58) Field of Classification Search
CPC .. G01J 2001/4252; G01J 3/513; G01J 1/0492; G01J 1/0204; G01J 3/0264;
(Continued)

(56) References Cited

U.S. PATENT DOCUMENTS 3,416,865 A * 12/1968 Townsend ................. G01J 1/24
356/435
5,381,103 A * 1/1995 Edmond ............ G01R 31/2635
324/754.06
(Continued)

FOREIGN PATENT DOCUMENTS

CN 203629685 U 6/2014
EP 1452842 A1 9/2004

*Primary Examiner* — Que Tan Le
*Assistant Examiner* — Jennifer D Bennett
(74) *Attorney, Agent, or Firm* — Cantor Colburn LLP; Tihon Poltavets (57) ABSTRACT

Technical solutions are described for testing a light emitting diode (LED) device. An example method includes driving, by a controller, a filter unit to filter a light from the LED device using a first filter. The method further includes, in response to a sensor not receiving a measurable signal because of the first filter, driving, by the controller, the filter unit to filter the light using a second filter. Further, in response to the sensor not receiving the measureable signal because of the second filter, the method includes outputting an indication that the LED device is rejected. Further, in response to the sensor receiving the measureable signal, the method includes outputting an indication that the LED device is of a color representative of the second filter.

20 Claims, 5 Drawing Sheets

(51) Int. Cl.
*G01J 1/04* (2006.01)
*G01J 3/28* (2006.01)
*G01J 1/16* (2006.01)

(52) U.S. Cl.
CPC .................. *G01J 2001/1678* (2013.01); *G01J 2001/4252* (2013.01); *G01J 2003/283* (2013.01)

(58) Field of Classification Search
CPC .. G01J 3/505; G01J 1/4228; G01J 2001/1678; G01J 2003/283; G01J 1/42
See application file for complete search history.

(56) References Cited

U.S. PATENT DOCUMENTS

| | | |
|---|---|---|
| 6,490,037 B1 | 12/2002 | Schmitt |
| 7,064,832 B2 | 6/2006 | Rogers |
| 7,227,639 B2 | 6/2007 | Schmitt |
| 8,178,827 B2 | 5/2012 | Langley et al. |
| 8,331,649 B2 | 12/2012 | Ji et al. |
| 2006/0214039 A1 | 9/2006 | Domanico |
| 2012/0038363 A1 | 2/2012 | Morrow et al. |
| 2012/0249779 A1 | 10/2012 | Ji et al. |
| 2012/0250021 A1* | 10/2012 | Cheng ....................... G01J 3/51 356/417 |
| 2016/0231170 A1 | 8/2016 | Wei |
| 2017/0234733 A1 | 8/2017 | Corrochano |

* cited by examiner

LIGHT EMITTING DIODE COLOR RESOLUTION TESTING

BACKGROUND

The present invention generally relates to light emitting diode (LED) technology and particularly to testing and improving the performance of an LED device.

LEDs are often used as external signals, internal diagnostics and for other suitable applications. Various devices, such as computers, servers, printed circuit boards, televisions, monitors, automobiles, lamps, and various other goods use LEDs. Testing such devices includes testing the performance of the LEDs. Testing an LED includes ensuring that the LED emits a predetermined type of light as desired. Determination of the color and brightness of the LEDs, beyond mere verification, typically requires extensive calibration and set-up to align sensors with the LEDs and run the wiring necessary for sending numerous signals to determine such parameters of the LEDs.

SUMMARY

One or more embodiments are described for testing a light emitting diode (LED) device. An example method includes driving, by a controller, a filter unit to filter a light from the LED device using a first filter. The method further includes, in response to a sensor not receiving a measurable signal because of the first filter, driving, by the controller, the filter unit to filter the light using a second filter. Further, in response to the sensor not receiving the measureable signal because of the second filter, the method includes outputting an indication that the LED device is rejected. Further, in response to the sensor receiving the measureable signal, the method includes outputting an indication that the LED device is of a color representative of the second filter.

One or more embodiments are described of a system for testing a color of light emitted by a light emitting diode (LED) device. An example system includes a filter unit that includes at least a first filter and a second filter. The system further includes a sensor, and a controller to select from the first filter and the second filter for testing the light from the LED device. The testing includes driving, by the controller, the filter unit to filter the light from the LED device using the first filter. The testing further includes, in response to the sensor not receiving a measurable signal because of the first filter, driving, by the controller, the filter unit to filter the light using a second filter. Further, in response to the sensor not receiving the measureable signal because of the second filter, the testing includes outputting an indication that the LED device is rejected. Further, in response to the sensor receiving the measureable signal, the testing includes outputting an indication that the LED device is of a color representative of the second filter.

One or more embodiments are described of a computer program product for testing a light emitting diode (LED) device. The computer program product includes a memory device with computer executable instructions therein, the instructions when executed by a controller test the LED. The testing includes driving, by the controller, a filter unit to filter the light from the LED device using a first filter. The testing further includes, in response to the sensor not receiving a measurable signal because of the first filter, driving, by the controller, the filter unit to filter the light using a second filter. Further, in response to the sensor not receiving the measureable signal because of the second filter, the testing includes outputting an indication that the LED device is rejected. Further, in response to the sensor receiving the measureable signal, the testing includes outputting an indication that the LED device is of a color representative of the second filter.

It is to be understood that the technical solutions are not limited in application to the details of construction and to the arrangements of the components set forth in the following description or illustrated in the drawings. The technical solutions are capable of embodiments in addition to those described and of being practiced and carried out in various ways. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods, and systems for carrying out the several purposes of the presently described technical solutions.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Typically, a light emitting diode (LED) has a particular color generates impure light that visually is in the same "color family," but not exactly the desired color. For example, a green LED may generate a pure green light in the range 532-565 nm and a yellowish-green light in the range 560-575 nm. From a visual perspective the two LEDs may be seen as green color during manual testing, and also typical mechanical test system may determine the LED as a "green" LED. Further, a yellow LED may generate light in the wavelength range 575-610 nm. If peak wavelength of the yellowish-green LED resides between 565-575 nm, the test system fails because it cannot judge the color correctly, and requires additional human inspection. Normally the failure false call rate is around 3%-5% between 565-575 nm.

Figure 1:
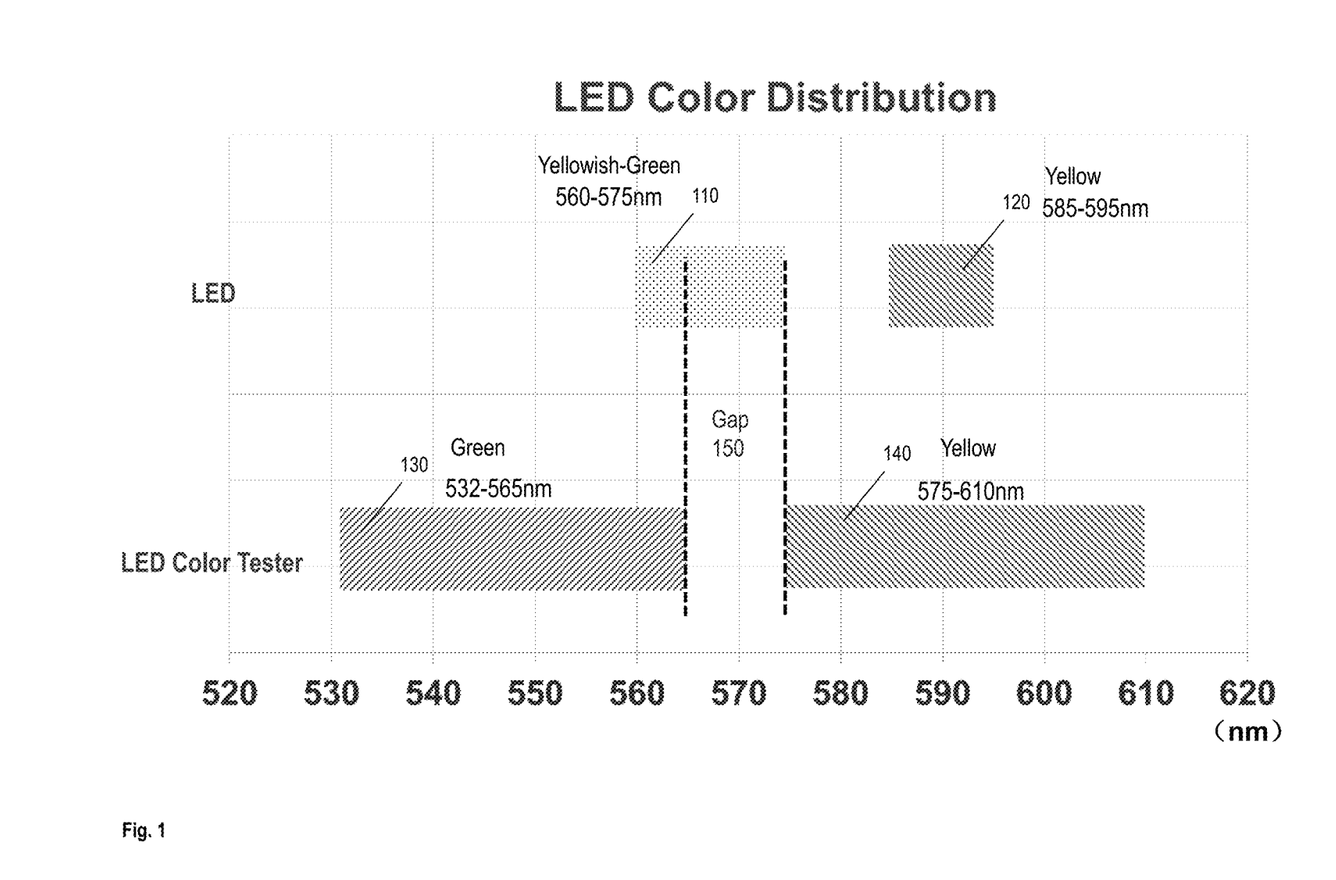
FIG. 1 depicts the technical challenge in testing green LEDs using a LED tester system according to one or more embodiments.

FIG. 1 depicts the technical challenge in testing green LEDs using a LED tester system according to one or more embodiments. The tester system uses a predetermined green 130 as light in the range 532-565 nm, and a predetermined yellow 140 as light in the range 575-610 nm range. LEDs generating a yellow light 120 in the 585-595 nm range are typically tested successfully to determine if yellow light is generated. However, green LEDs generating yellowish-green light 110 in the 560-575 nm may not be successfully tested if the light generated is in the gap 150 range of 565-575 nm. It should be noted that the above ranges and colors are just examples and that in other embodiments of the present invention the tester system and LEDs may be used for different colored lights, such as orange, red, blue, etc.

Particularly for the case of green and yellowish-green, users may use the combination of green and yellow colors to indicate the function of pass or fail. From a visual perspective, both pure green and yellowish-green LED can show a green color. But users may intend to use yellowish-green LED for reasons like (1) Simple circuit design: the driving voltage for yellow green and yellowish-green LED is 2.0 volts without additional complex design for PCBA; but the driving voltage for pure green LED is 3.3 volts which require a circuit design that fulfils both 2.0 volts and 3.3 volts; (2) Wider offerings and competitive cost.

The technical solutions described herein address such technical challenges in order to benefit manufacture test yield of LEDs, such as yellowish-green LEDs that may generate light that falls within a gap 150 between two predetermined light colors. For example, the technical solutions ensure test accuracy for yellowish-green LED with peak wavelength resides between 565-575 nm, overlapping the gap 150 between green 130 and yellow 140. In one or more examples, the technical solutions described herein address the technical challenges by improving existing LED color tester systems and can be used in mass production to achieve full automation for color detection, without human intervention.

The technical solutions described herein include an apparatus that includes a combination of two filters (filter units). The apparatus is added between a sensor and a light source in typical LED tester system. The apparatus is used to avoid the failure false call of the LED color tester. In one or more examples, particularly for the yellowish-green case, the filter units include a 585 nm long pass filter and a 565 nm short pass filter. The 585 nm long pass filter blocks the wavelength below 585 nm; the 565 nm short pass filter blocks the wavelength above 565 nm. For other cases, the apparatus includes filter units of a first wavelength and a second wavelength, different than those above.

Further, the technical solutions include a controlling system, including a motor. The controlling system enables the filter unit for color detection, only when the peak wavelength resides in the gap 150, for example between 565-575 nm. Light from the LED being tested is transmitted by a light pipe, filtered by the filter unit, and then detected by the sensor. The sensor receives two series of signals (color and brightness) corresponding to the two filter wavelengths of the filter unit, for example 565 nm short pass filter and 585 nm long pass filter, respectively. The LED color tester compares the brightness signals and then outputs the color with stronger brightness.

Various implementations of such technical solutions improve the LED color resolution and test accuracy especially for identifying LED with peak wavelength residing in the gap 150, for example a yellowish-green LED with peak between 565-575 nm. Further, such implementations can be automated for further improving test accuracy and efficiency of the LED color tester. Further, the technical solution may be implemented, in one or more examples, with minor design changes to existing LED color testers supplemented with the apparatus using a combination of two filters, and thus, may be compatible with existing LED color tester.

It is to be noted that, the technical solutions are not limited to any particular combination of colors such as yellowish-green, although that is the example used throughout the description herein. The technical solutions described herein can be extended to detect other mixed colors with similar wavelength by changing the filter unit.

Figure 2:
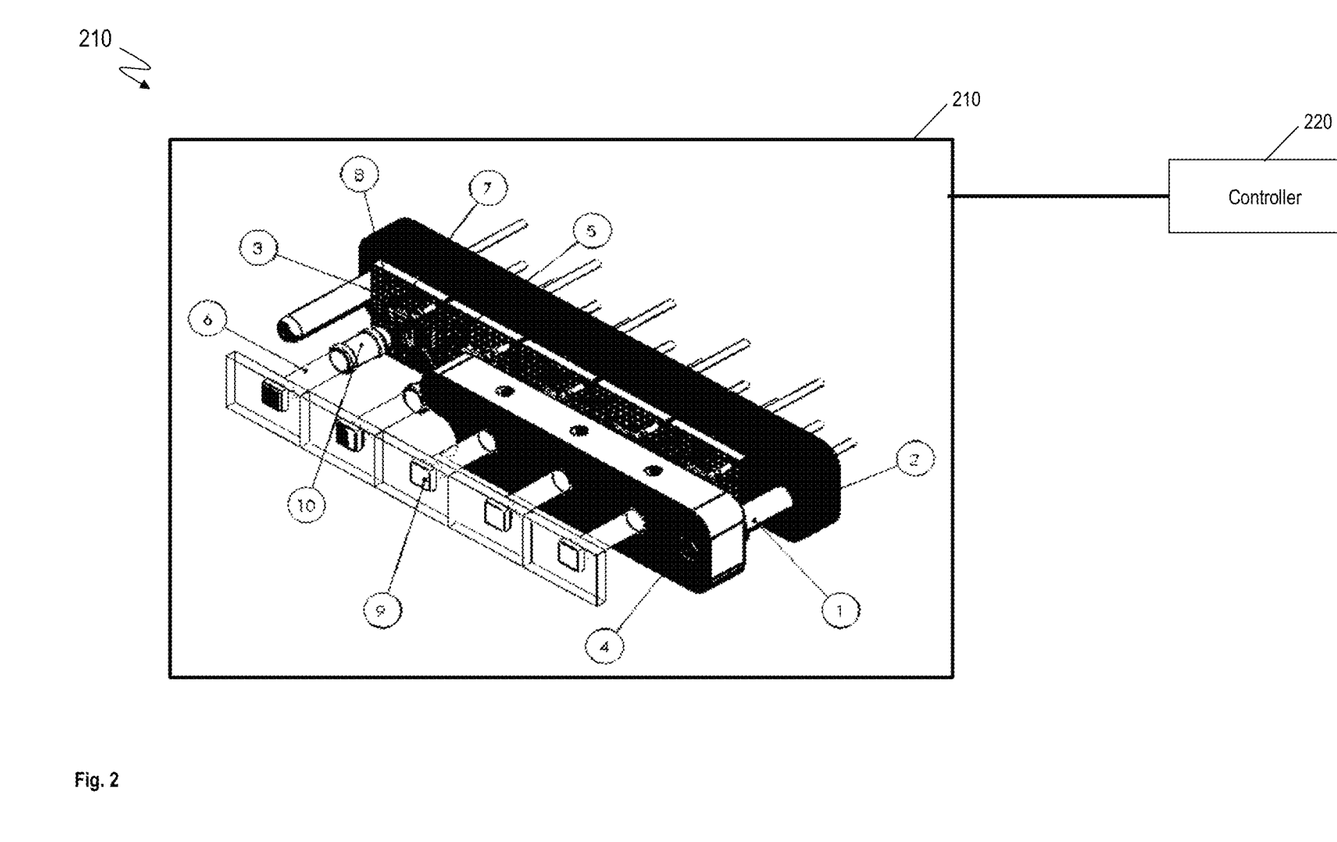
FIG. 2 depicts an example system for testing an LED according to one or more embodiments.

FIG. 2 depicts an example system for testing an LED according to one or more embodiments. An LED testing system 210 may also be referred to as a LED resolution device. The LED testing system 210 includes, among other components, a circuit board 3, a light pipe holder 4, a light pipe 6, a filter unit 5, a chip 7, a sensor 8, and a light pipe sleeve 10. FIG. 2 also depicts an LED 9 being tested. In one or more examples, the LED testing system includes multiple instances of these components for testing multiple LEDs 9 in parallel. FIG. 2 further depicts a top plate 2 that holds the components together using one or more fasteners, such as pins/screws 1. A controller 220 may send commands/instructions to one or more components of the LED testing system 210, such as the filter unit 5 adjust the operation of the components to test the LED 9.

The fasteners 1 join the top plate 2 and light pipe holder 4, among other components. The Top Plate 2 is a block to which the components are attached; for example, the sensors 8 are attached through pre-drilled holes to where the fasteners 1 pass through. Additional holes may also be added for the stepper motor drive shaft (not shown) to where the filter arms are constructed. The Pipe Holder 4 is a component that holds the light pipes 6 in a stationary position. The Light Pipe 6 is a plastic pipe or glass pipe, or a pipe made of any other material to transmit the light from the LED 9 to the sensor 8. The light pipe can focus the light inside the pipe 6 instead of scattering the light when transmitting the light for a long distance from the LED 9 to the sensor 8. Further, the Chip 7 may be a microprocessor integrated on a circuit plate, and can save and analyze the wavelength and brightness data from the sensor 8. The Sensor 8 is for detecting the brightness and wavelength signals of the light source (LED 9). In one or more examples, the sensor 8 may be integrated with the chip 7. The Light Pipe Sleeve 10 is a replaceable bushing sleeve mounted in the pipe holder 4 to where the light pipes 6 pass. The light pipe sleeve 10 acts as a guide for installing the light pipe 6.

Figure 3:
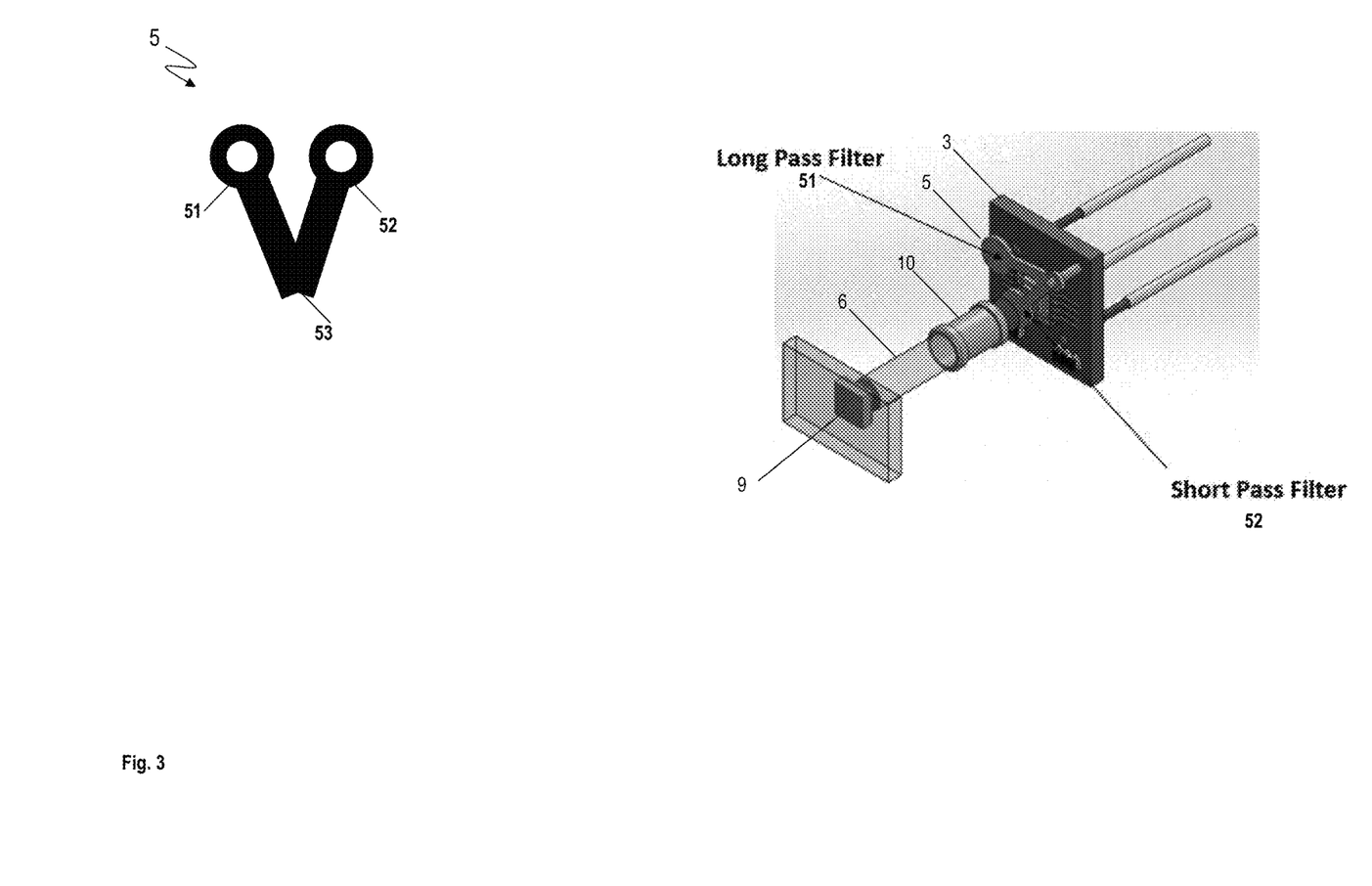
FIG. 3 depicts a partial view of the LED testing system according to one or more embodiments.

FIG. 3 depicts a partial view of the LED testing system according to one or more embodiments. Particularly, the filter unit 5 is shown enlarged. The filter unit 5 includes a first arm 51 and a second arm 52 connected with each other at a joining point 53. In one or more examples, the filter unit 5 may make the shape like a 'Y', or a 'V', although other shapes are also possible. The first arm 51 includes a first filter that only passes light within a first wavelength and the second arm 52 includes a second filter that only passes light within a second wavelength range. For example, for testing the yellowish-green LED, the filter unit 5 the first filter is a 565 nm short pass filter and the second filter is a 585 nm long pass filter.

During the testing, while the LED 9 is turned ON, the light is transmitted through the light pipe 6 and filtered by the filter unit 5. After the two filters of the filter unit 5 are used in an orderly manner, light in the gap 150 (e.g. between the wavelength region from 565 to 585 nm) cannot be detected by the sensor 8, and instead the sensor 8 can only detect the remaining light from the LED 9. In this case, the chip 7 analyzes and saves the brightness and wavelength data from the two filter units, for example "green" part and the "yellow" part. Finally, the chip 7 compares the brightness signals and outputs the color data of stronger one of the two brightness signals.

Figure 4:
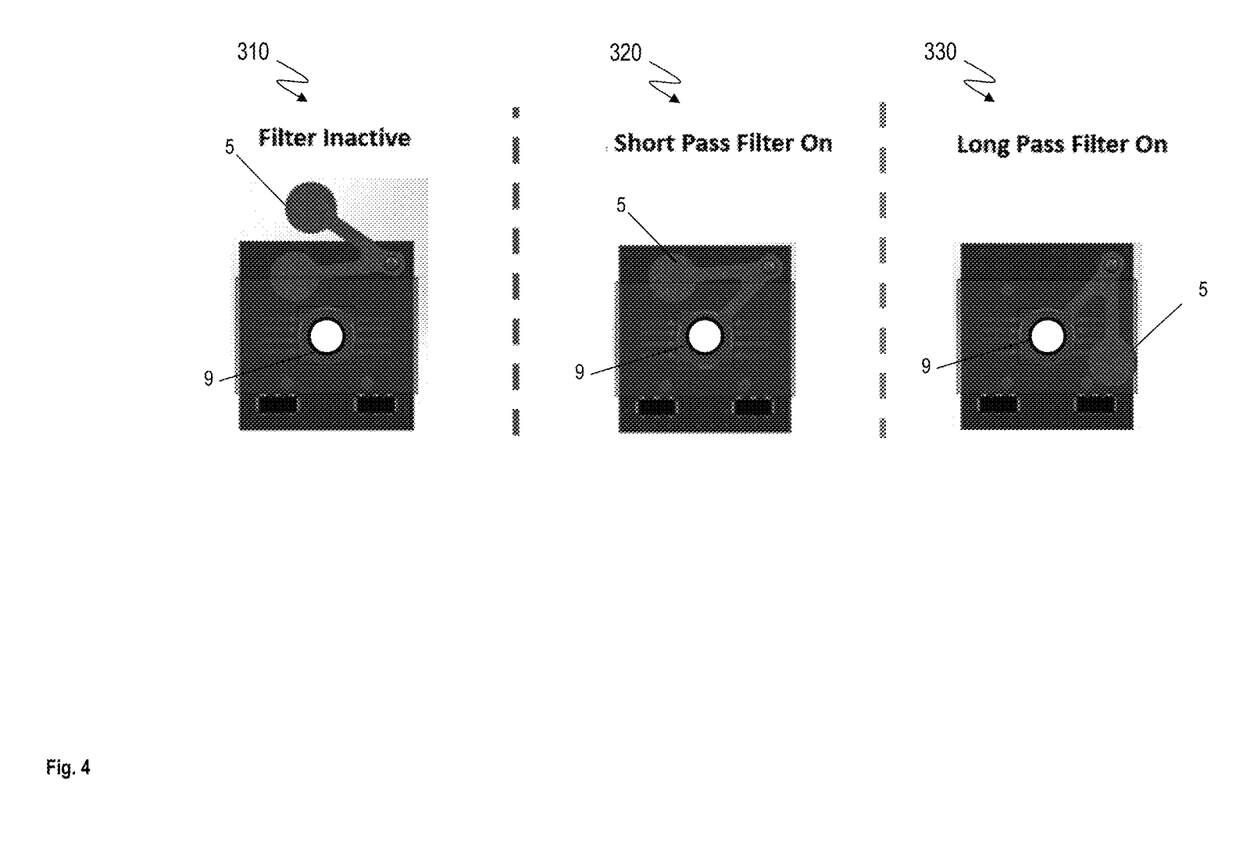
FIG. 4 depicts different positions of the filter unit to perform the LED testing according to one or more embodiments.

FIG. 4 depicts different positions of the filter unit to perform the LED testing according to one or more embodiments. The controller 220 controls the position of the filter unit 5. As described herein, in one or more examples, the filter unit 5 may have a 'Y' type construction with two arms (51, 52) where both ends of the arms each have a filter. The controller 220 adjusts the position of the filter unit in three different positions to facilitate each filter to step in one by one and correspondingly block a particular wavelength region after a certain interval of time. The sensor 8 measures the color wavelength and brightness accurately of the light source (LED 9) after filtered by the two different filters of the arms (51, 52). For example, the joining point 53 is attached to a stepper motor (not shown) through a common pivot hole and swivels like a pendulum during operation. The controller 220 commands the position of the motor to adjust the position of the filter unit 5.

The three stages/phases of the filter unit 5 once activated include an inactive position 310. In the inactive position, neither of the two filters of the filter unit 5 are used to filter the light from the LED 9. The controller 220 adjusts the filter unit in the inactive position 310 during phase I, which lasts for a predetermined duration.

The filter unit 5 can also be adjusted into a first short pass position 320. From the stationary position during the inactive position 310, the stepper motor is rotated to a particular pre-coded degree and stopped for a determined period of phase II. The motor is rotated and stopped by the controller 220. This enables the short pass filter on the first arm 51 of the filter unit 5 to block the light coming from the LED 9 through the light pipe 6. The sensor 8 then receives the signal generated by the short pass filter of the filter unit 5.

Further, the filter unit 5 is adjusted to a long filter position 330. From the short pass position 320, the filter unit 5 is rotated in a similar manner by the controller 220 by adjusting the motor to place the filter unit 5 in the long pass position 330. The controller 220 changes the filter unit 5 from the short pass position 320 to the long pass position 330 after a predetermined duration. In the long pass position, the sensor 8 collects the signal passed through the long pass filter of the filter unit 5 on the second arm 52.

The controller 220 after obtaining sensor values in both, the short pass position 320 and the long pass position 330, returns the filter unit 5 to the original position (inactive position 310) by turning the filter unit around the pivot point 53 (joining point).

Figure 5:
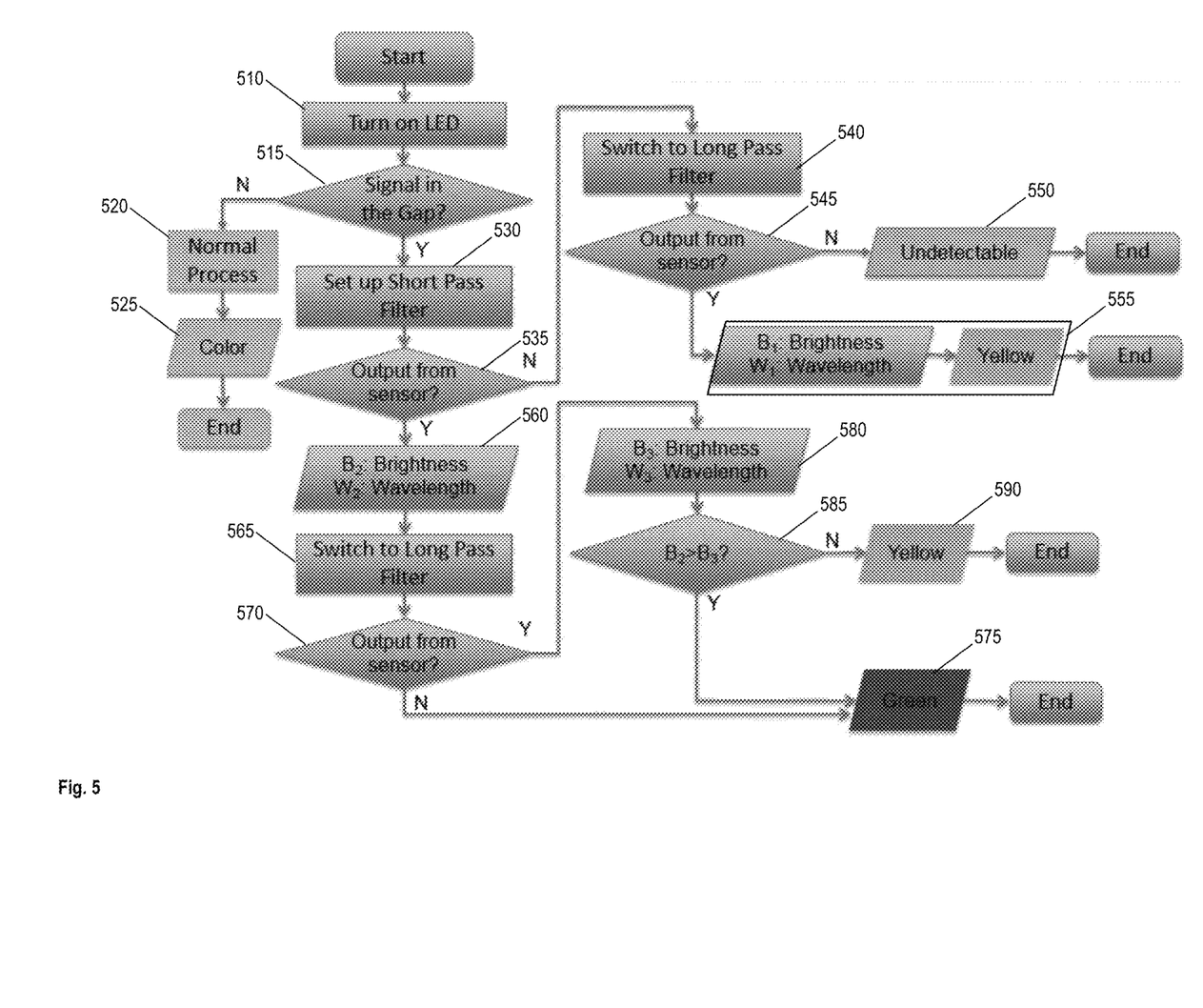
FIG. 5 depicts a flowchart of an example method for testing an LED according to one or more embodiments.

FIG. 5 depicts a flowchart of an example method for testing an LED according to one or more embodiments. The method facilitates testing an LED that may generate light in a predetermined gap 150. The flowchart shows a specific example scenario of testing a yellowish-green LED in the 565-575 nm gap 150, however it should be noted that the method can be used for any other gap 150.

The method includes starting the LED 9 that is to be tested and receiving, at the sensor 8, the light from the LED 9 via the various components of the tester system 210, such as the light pipe 6, at 510. The controller 220 sets the filter unit 5 in the inactive position 310 initially. Based on the readings at the sensor 8 the controller 220 determines if the light from the LED 9 is in the gap 150, at 515.

If there is no signal detected in the gap 150 (wavelength region between 565-575 nm for yellowish-green), which means the luminescence peak wavelength of the LED is not in the gap 150, then the tester system 210 does not drive the filter unit 5 but undergo typical process to measure the brightness and wavelength signals to detect the color of the LED 9 in the inactive position 310, 520 and 525. The color of the light emitted by the LED 9 is based on the brightness (B) and wavelength (W) of the light as measured by the sensor 8.

Alternatively, if the LED 9 luminescence peak wavelength resides in the gap 150 (from 565-575 nm), then the sensor 8 receives signals in the gap 150. In this case, the controller 220 adjusts the motor to drive the filter unit 5 in the short pass position 320, at 530. In this position, the first wavelength filter of the first arm 51 (565 nm Short Pass Filter) steps in between the LED 9 and the sensor, resulting in blocking the light with wavelength above the filter (565 nm). It should be noted that although the example herein performs the short pass filter first and the long pass filter later, in other examples the order may be reversed.

If the sensor 8 does not detect any brightness and wavelength signals in the short pass position 320, the controller 220 adjusts the motor to drop out the short pass filter (565 nm) and subsequently initiate the long pass filter (585 nm) of the second arm 52 of the filter unit 5 in the long pass position 330, at 540. The long pass filter blocks the light which has wavelength below the second wavelength (585 nm). If no signals are detected by the sensor 8 with the second filter activated, then the tester system 210 outputs that the LED 9 is undetectable, at 545 and 550. Alternatively, if signals are detected by the sensor 8, then the tester system 210 outputs that the light detected from the LED 9 is of the second color with higher wavelength, in this case, yellow color, at 545 and 555. The controller 220 computes the color based on the brightness (B1) and wavelength (W1) of the light, as measured by the sensor 8.

Referring back, if the sensor 8 detects brightness (B2) and wavelength (W2) signals in the short pass position 320, the chip 7 stores and analyzes the measurements, at 560 and further the controller 220 switches the filter unit 5 to the long pass position 330, at 565. In the long pass position 330 the second filter (585 nm) on the second arm 52 of the filter unit 5 is activated in order to block the light with wavelength below the second wavelength (585 nm). If no signals are detected by the sensor 8 in the long pass position, then the tester system 210 outputs that the light detected from the LED 9 is of the first color with lower wavelength, in this case as green color, at 570 and 575. Instead, if signals are detected by the sensor 8 in the long pass position 330, the chip 7 reads the brightness (B2) and the wavelength (W2) from the sensor in the long pass position 330 and compares the two brightness signals data (B2 and B3), at 580. If B2>B3 then the tester system 210 outputs the light as being the second color with higher wavelength, in this case yellow color, at 590. If B2<B3 then the tester system 210 outputs the color being detected as the lower wavelength color, in this case the green color, at 575.

In one or more examples, the controller 220 switches from one position to another after a predetermined amount of time based on the condition(s) detected, thus facilitating the method to be implemented in an automated manner.

The technical solutions described herein facilitate an LED testing system to use a dual filter unit to distinguish minor difference in colors that have wavelengths substantially close to each other with a known gap in which manufactured LEDs may emit light. The technical solutions address the technical challenges in testing LEDs faced with such a gap by using a dual filter that can be driven using a motor or in any other manner, instead of relying on RGB photo diodes to read the intensity and color of the tested LED, which face the described the technical challenges.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for testing a light emitting diode (LED) device, the method comprising:
   driving, by a controller, a filter unit to filter a light from the LED device using a first filter; and
   in response to a sensor not receiving a measurable signal because of the first filter:
      driving, by the controller, the filter unit to filter the light using a second filter;
      in response to the sensor not receiving the measureable signal because of the second filter, outputting an indication that the LED device is rejected; and
      in response to the sensor receiving the measureable signal, outputting an indication that the LED device is of a color representative of the second filter.

2. The computer-implemented method of claim 1, wherein the controller drives the filter unit by commanding a motor to rotate the filter unit.

3. The computer-implemented method of claim 1, wherein the color is a first color, and the first filter is representative of a second color.

4. The computer-implemented method of claim 3, wherein the first color is yellow and the second color is green.

5. The computer-implemented method of claim 1, wherein in response to the sensor receiving the measurable signal because of the first filter:
   storing, by the controller, a first brightness (B2) measurement of the light from the LED device passing through the first filter;
   driving, by the controller, the filter unit to filter the light using the second filter; and in response to the sensor not receiving the measureable signal because of the second filter, outputting an indication that the LED device is of a second color representative of the first filter.

6. The computer-implemented method of claim 5, further comprising:
in response to the sensor receiving the measureable signal because of the second filter:
comparing, by the controller, a second brightness (B3) measurement of the light from the LED device passing through the second filter, and the first brightness measurement (B2); and
in response to the first brightness measurement being larger than the second brightness measurement, outputting the indication that the LED device is of the color representative of the second filter.

7. The computer-implemented method of claim 6, further comprising:
in response to the first brightness measurement not being larger than the second brightness measurement, outputting the indication that the LED device is of the second color representative of the first filter.

8. A system for testing a color of light emitted by a light emitting diode (LED) device, the system comprising:
a filter unit comprising at least a first filter and a second filter;
a sensor; and
a controller configured to select from the first filter and the second filter for testing the light from the LED device, the testing comprising:
driving, by the controller, the filter unit to filter the light from the LED device using the first filter; and
in response to the sensor not receiving a measureable signal because of the first filter:
driving, by the controller, the filter unit to filter the light using a second filter;
in response to the sensor not receiving the measureable signal because of the second filter, outputting an indication that the LED device is rejected; and
in response to the sensor receiving the measureable signal, outputting an indication that the LED device is of a color representative of the second filter.

9. The system of claim 8, wherein the controller drives the filter unit by commanding a motor to rotate the filter unit.

10. The system of claim 8, wherein the color is a first color, and the first filter is representative of a second color.

11. The system of claim 10, wherein the first color is yellow and the second color is green.

12. The system of claim 8, wherein the testing further comprises:
in response to the sensor receiving the measurable signal because of the first filter:
storing, by the controller, a first brightness (B2) measurement of the light from the LED device passing through the first filter;
driving, by the controller, the filter unit to filter the light using the second filter; and
in response to the sensor not receiving the measureable signal because of the second filter, outputting an indication that the LED device is of a second color representative of the first filter.

13. The system of claim 12, wherein the testing further comprises:
in response to the sensor receiving the measureable signal because of the second filter:
comparing, by the controller, a second brightness (B3) measurement of the light from the LED device passing through the second filter, and the first brightness measurement (B2); and
in response to the first brightness measurement being larger than the second brightness measurement, outputting the indication that the LED device is of the color representative of the second filter.

14. The system of claim 13, wherein the testing further comprises, in response to the first brightness measurement not being larger than the second brightness measurement, outputting the indication that the LED device is of the second color representative of the first filter.

15. A computer program product for testing a light emitting diode (LED) device, the computer program product comprising a memory device with computer executable instructions therein, the instructions when executed by a controller test the LED, the testing comprising:
driving, by a controller, a filter unit to filter a light from the LED device using a first filter; and
in response to a sensor not receiving a measurable signal because of the first filter:
driving, by the controller, the filter unit to filter the light using a second filter;
in response to the sensor not receiving the measureable signal because of the second filter, outputting an indication that the LED device is rejected; and
in response to the sensor receiving the measureable signal, outputting an indication that the LED device is of a color representative of the second filter.

16. The computer program product of claim 15, wherein the controller drives the filter unit by commanding a motor to rotate the filter unit.

17. The computer program product of claim 15, wherein in response to the sensor receiving the measurable signal because of the first filter:
storing, by the controller, a first brightness (B2) measurement of the light from the LED device passing through the first filter;
driving, by the controller, the filter unit to filter the light using the second filter; and
in response to the sensor not receiving the measureable signal because of the second filter, outputting an indication that the LED device is of a second color representative of the first filter.

18. The computer program product of claim 17, wherein the testing further comprises:
in response to the sensor receiving the measureable signal because of the second filter:
comparing, by the controller, a second brightness (B3) measurement of the light from the LED device passing through the second filter, and the first brightness measurement (B2); and
in response to the first brightness measurement being larger than the second brightness measurement, outputting the indication that the LED device is of the color representative of the second filter.

19. The computer program product of claim 18, wherein, in response to the first brightness measurement not being larger than the second brightness measurement, outputting the indication that the LED device is of the second color representative of the first filter.

20. The computer program product of claim 19, wherein the color is yellow and the second color is green.

\* \* \* \* \*